United States Patent [19]
Calvin

[11] Patent Number: 6,058,767
[45] Date of Patent: May 9, 2000

[54] MEASUREMENT OF WHEEL BEARING END PLAY

[75] Inventor: Jeff S. Calvin, Alliance, Ohio

[73] Assignee: The Timken Company, Canton, Ohio

[21] Appl. No.: 09/031,870

[22] Filed: Feb. 27, 1998

[51] Int. Cl.[7] .............................................. G01M 15/00
[52] U.S. Cl. ........................ 73/118.1; 73/865.9; 33/517
[58] Field of Search ............................. 73/118.1, 865.9; 33/517, 645, 203.18, 651, 181 AT

[56] References Cited

U.S. PATENT DOCUMENTS

| | | | |
|---|---|---|---|
| 3,828,614 | 8/1974 | Borg | 74/16 |
| 4,054,999 | 10/1977 | Harbottle | 33/181 AY |
| 4,958,440 | 9/1990 | Pipes | 33/645 |
| 5,058,424 | 10/1991 | O'Hara | 73/118.1 |
| 5,443,316 | 8/1995 | Deane et al. | 384/485 |
| 5,488,871 | 2/1996 | Harbottle et al. | 73/862.55 |

*Primary Examiner*—George Dombroske
*Attorney, Agent, or Firm*—Jones, Day, Reavis & Pogue

[57] ABSTRACT

An articulated support assembly threadably attached to a threaded fastener element on a wheel hub that is rotatably supported on an axle by a bearing assembly. The support assembly carries a dial indicator having an actuator, and is selectively adjustable to align the actuator with the axle longitudinal axis and to place the actuator in engagement with a fixed reference surface provided on the end of the axle. A selectively operable clamping device locks the support assembly against further movement following adjustment. Axial force applied to the hub first in one direction and then in an opposite direction moves the hub between the limits of the bearing internal axial clearance. The support assembly and dial indicator move with the hub, and cooperation between the actuator and the fixed reference surface moves the actuator the same axial distance as the hub to provide a measurement of the bearing internal axial clearance.

20 Claims, 6 Drawing Sheets

MEASUREMENT OF WHEEL BEARING END PLAY

BACKGROUND OF THE INVENTION

This application relates to the art of measurement and, more particularly, to an apparatus and method for measuring bearing internal axial clearance. The invention is particularly applicable for use in measuring bearing end play on truck wheel assemblies and will be described with specific reference thereto. However, it will be appreciated that the invention has broader aspects and can be used for measuring bearing end play in other environments A predetermined amount of internal axial clearance that is called mounted end play typically is provided in bearings used for wheel end and industrial shaft applications. Mounted end play within certain limits is advantageous for long bearing life, and bearing damage may occur when mounted end play is not within the prescribed limits. Excessive end play may cause bearing seal damage and loss of lubricant which reduces bearing life. Tolerances on end play have been reduced from 0.001–0.010 inch to 0.001–0.005 inch and the closer tolerance is much more difficult to achieve.

Existing arrangements and procedures for measuring mounted end play are awkward and difficult to use, and accuracy of the mounted end play adjustment frequently has been left to the know-how and skill of an experienced installer. Application of a predetermined torque to the adjustment nut cannot be relied on to provide one hundred percent accuracy for adjustment of the bearing internal axial clearance. One known arrangement for measuring mounted end play relies on magnets to hold the measuring assembly to a wheel end. However, this assembly cannot be used on nonferrous wheels or wheel hubs, and the assembly is not sufficiently stable or rigid to enable accurate or repeatable measurements.

It would be desirable to provide a rigid and stable mounting arrangement for a mounted end play measuring apparatus that provides accurate measurements in a more simplified manner.

SUMMARY OF THE INVENTION

Apparatus for measuring bearing internal axial clearance includes an articulated support assembly that is threadably attachable to a threaded fastener element on a wheel hub to provide a rigid and stable connection between the support assembly and the wheel hub. The threaded fastener element on the wheel hub to which the support assembly is threadably attachable may be a threaded stud on a drive wheel hub or tapped hole on a non-drive wheel hub. Adapters and connectors may be used to provide a rigid threaded connection between the support assembly and the wheel hub.

A dial indicator carried by the articulated support assembly for measuring bearing internal axial clearance has an actuator plunger that cooperates with a fixed reference surface provided at the end of an axle. The articulated support assembly is adjustable to position the actuator in alignment with the axle longitudinal axis and in engagement with the fixed reference surface. Following adjustment, the support assembly is locked into a very rigid state to maintain the adjusted position of the actuator.

Bearing internal axial clearance is measured by assembling and positioning the measuring apparatus as described above. Pulling force then is applied to the wheel while rotatably oscillating same about 90° to bottom out the bearing at one end limit. The dial indicator then is zeroed followed by inward pushing force applied to the wheel while rotatably oscillating same to bottom out the bearing at the opposite end limit of the bearing internal axial clearance. Inward movement of the spring loaded actuator plunger back into the dial indicator during this movement of the wheel and support assembly from one end limit to the other relative to the fixed end of the axle measures the bearing internal axial clearance.

In accordance with one arrangement, the articulated support assembly includes a first support rod having an internally threaded socket on one end portion thereof for attachment to one of the threaded studs on the drive wheel hub that normally are used for attaching a drive shaft to the hub.

In another arrangement, the first support rod has an externally threaded end portion for reception in a tapped hole in a non-drive wheel hub that normally receives a bolt for a dust cover. A wing nut may be threaded on the rod for tightening against the outer surface of the wheel hub to rigidify attachment of the support rod and lock it against movement.

When attached to the wheel hub, the first support rod extends substantially parallel to the axle longitudinal axis and is spaced radially outwardly from such axis. The first support rod also extends axially outwardly beyond the outer end of the axle. A second support rod is adjustably attached to the first support rod and carries a dial indicator. The second support rod extends transversely perpendicular to the first support rod toward the outer end of the axle in outwardly-spaced relationship thereto.

The second support rod is attached to the first support rod by an adjustable clamping arrangement that allows the second support rod to rotate about the first support rod, to move axially along the first support rod and to move axially along its own length. This articulated connection of the second support rod to the first support rod permits alignment of an actuator plunger on the dial indicator with the longitudinal axis of an axle, and also permits engagement of the actuator plunger with a fixed reference surface that is provided on the axle end. Following adjustment to locate the actuator plunger in the proper position, the clamping device is locked to prevent any further movement of the support assembly.

When the measuring apparatus is used with axles that have an end recess, a ball bearing is positioned in the recess and retained therein by grease to provide a fixed reference surface or point for engagement by the actuator plunger on the dial indicator.

When the axle is tubular or otherwise lacks a suitable recess for receiving a ball bearing, a magnetic end plate is attached to the end of the axle. The end plate has an outwardly facing central projection that preferably is substantially spherical or otherwise curved to provide a fixed reference surface for engagement by the actuator plunger on the dial indicator. The ball bearing or projection provide a fixed reference on the longitudinal axis of the axle for optimum measurement accuracy.

It is a principal object of the present invention to provide an improved apparatus and method for measuring bearing internal axial clearance.

It is also an object of the invention to provide such a measuring apparatus that is firmly attachable to a wheel hub by a non-magnetic mechanical fastening arrangement that requires no modification of existing wheel hubs.

It is also an object of the invention to provide such a measuring apparatus that can be used with non-ferrous wheels and wheel hubs.

It is another object of the invention to provide such a measuring apparatus that is relatively simple to install and operate.

It is a further object of the invention to provide such a measuring apparatus that has a relatively small number of parts.

It is an additional object of the invention to provide such a measuring apparatus having an articulated support assembly that facilitates alignment of an actuator on a dial indicator with the longitudinal axis of an axle, and also facilitates engagement of the actuator with a fixed reference surface on the end of the axle.

DESCRIPTION OF PREFERRED EMBODIMENTS

Figure 1:
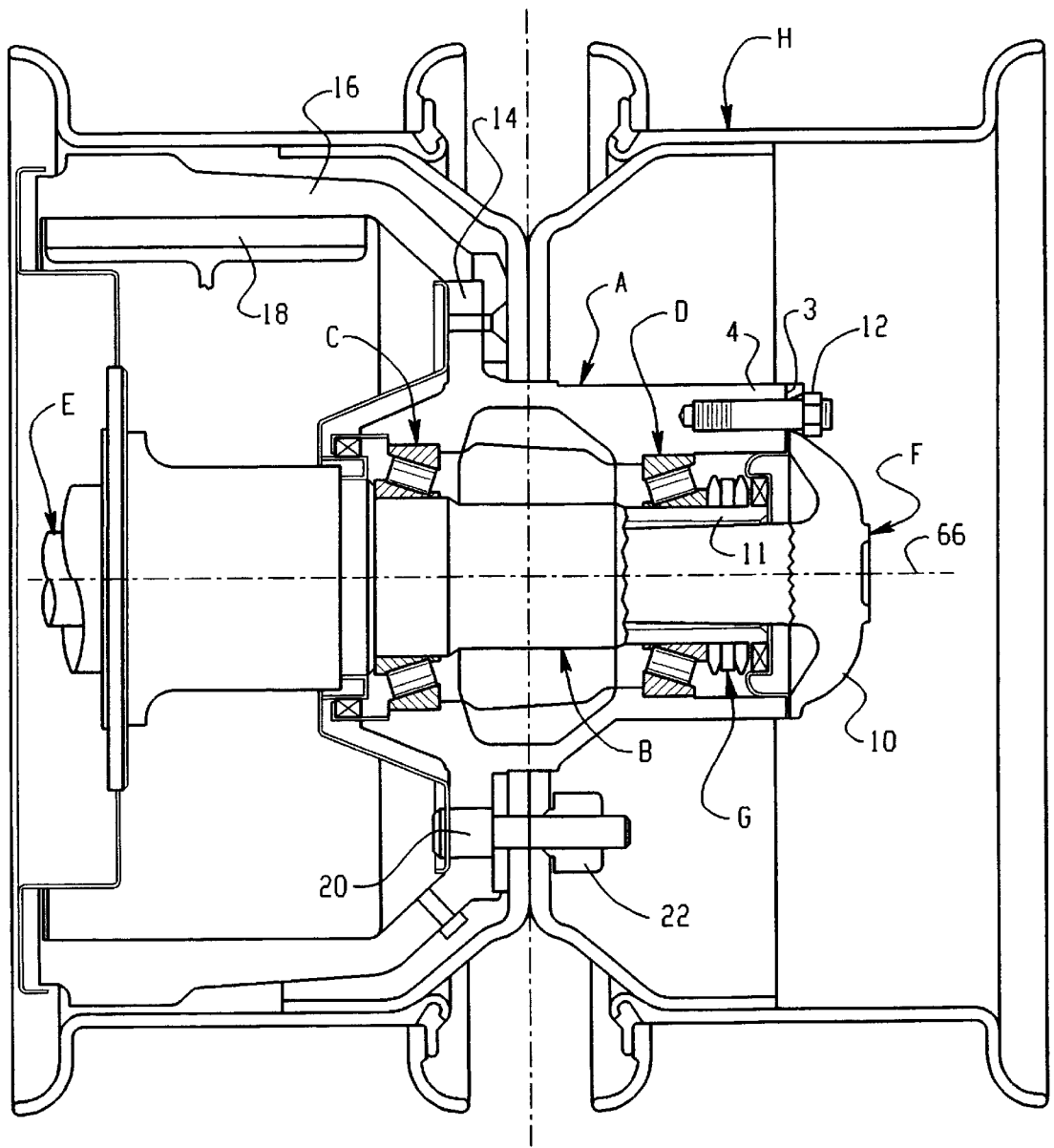
FIG. 1 is a cross-sectional elevational view of a typical truck rear drive wheel with which the measuring apparatus and method of the present application are used.

Referring now to the drawings, wherein the showings are for purposes of illustrating certain preferred embodiments of the invention only and not for purposes of limiting same, FIG. 1 shows a truck rear drive wheel assembly having a wheel hub A rotatably mounted on a tubular axle B by tapered roller bearing assemblies C and D. The bearing assemblies and wheel hub are retained on tubular axle B by an adjustable retainer assembly G that typically includes an adjusting nut, a washer and a jam nut received on an externally threaded outer end portion 11 of axle B.

A drive shaft E extends through tubular axle B and has a separable outer end portion F that is connected to the main drive shaft within tubular axle B by a separable splined connection in a known manner. An outwardly extending flange 10 on removable drive shaft portion F is attached to wheel hub A by a plurality of circumferentially-spaced nut and stud threaded fastener assemblies, only one of which is shown at 12 in FIG. 1. The nuts are removable from the threaded studs of fastener assemblies 12 so that outer drive shaft portion F can be removed by pulling it axially to the right in FIG. 1 to separate the splined connection with the main drive shaft portion. This provides access to adjustable retainer assembly G and to end portion 11 of tubular axle B, and leaves the studs of fastener assemblies 12 extending outwardly from annular flat end 3 on wheel hub cylindrical hollow end portion 4. The annular flat end 3 of wheel hub end portion 4 lies in a plane that extends perpendicular to the longitudinal axis of axle B.

An outwardly extending circumferential flange 14 on wheel hub A has a brake drum 16 attached thereto for cooperation with brake shoes 18 in a known manner. Wheel hub flange 14 has a plurality of circumferentially-spaced bolts press fitted through holes therein for attaching a wheel H thereto, and only one of such bolts is indicated at 20 in FIG. 1. Wheel H is positioned on hub A with bolts 20 extending through suitable holes in wheel H, and nuts as indicated at 22 are applied to the bolts for attaching wheel H to wheel hub A.

Figure 2:
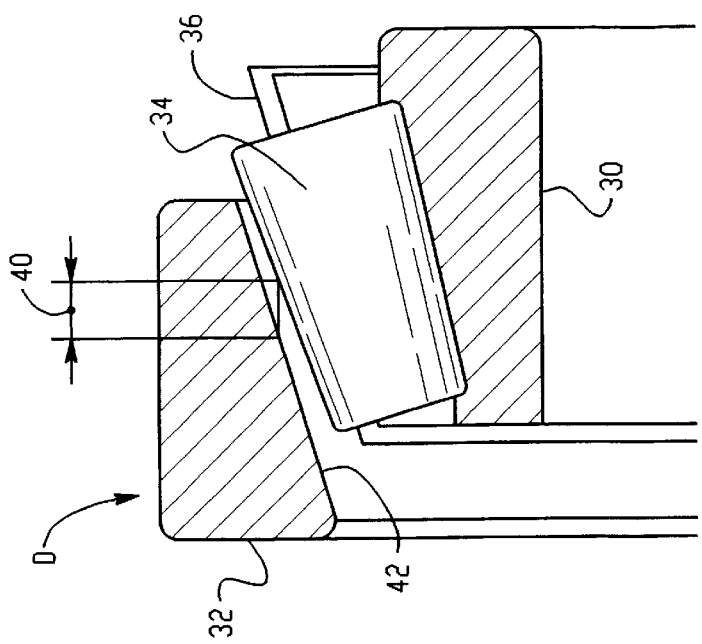
FIG. 2 is a cross-sectional elevational view of a bearing and illustrating an example of bearing internal axial clearance.

FIG. 2 shows bearing assembly D having an inner cone 30 and an outer cup 32 between which a plurality of tapered rollers 34 are received and maintained circumferentially separated by a cage 36. The axial distance indicated by numeral 40 in FIG. 2 between the outer surface of roller 34 and the surface of outer race 42 on cone 32 is the bearing internal axial clearance which is also called bearing end play or mounted end play. This axial clearance is adjustable by use of adjustable retainer assembly G in FIG. 1.

Non-drive wheels have a dust cover that closes the open end of the wheel hub and is attached to the annular flat end of the wheel hub by bolts that extend into tapped holes in the annular flat end. Thus, the annular flat end of the cylindrical end portion of the drive hub has threaded studs extending outwardly therefrom in the case of a drive wheel hub and has tapped holes extending inwardly thereof in the case of a non-drive wheel hub. The axes of these studs and tapped holes extend parallel to the axle longitudinal axis and are spaced radially outwardly from such axis.

Figure 3:
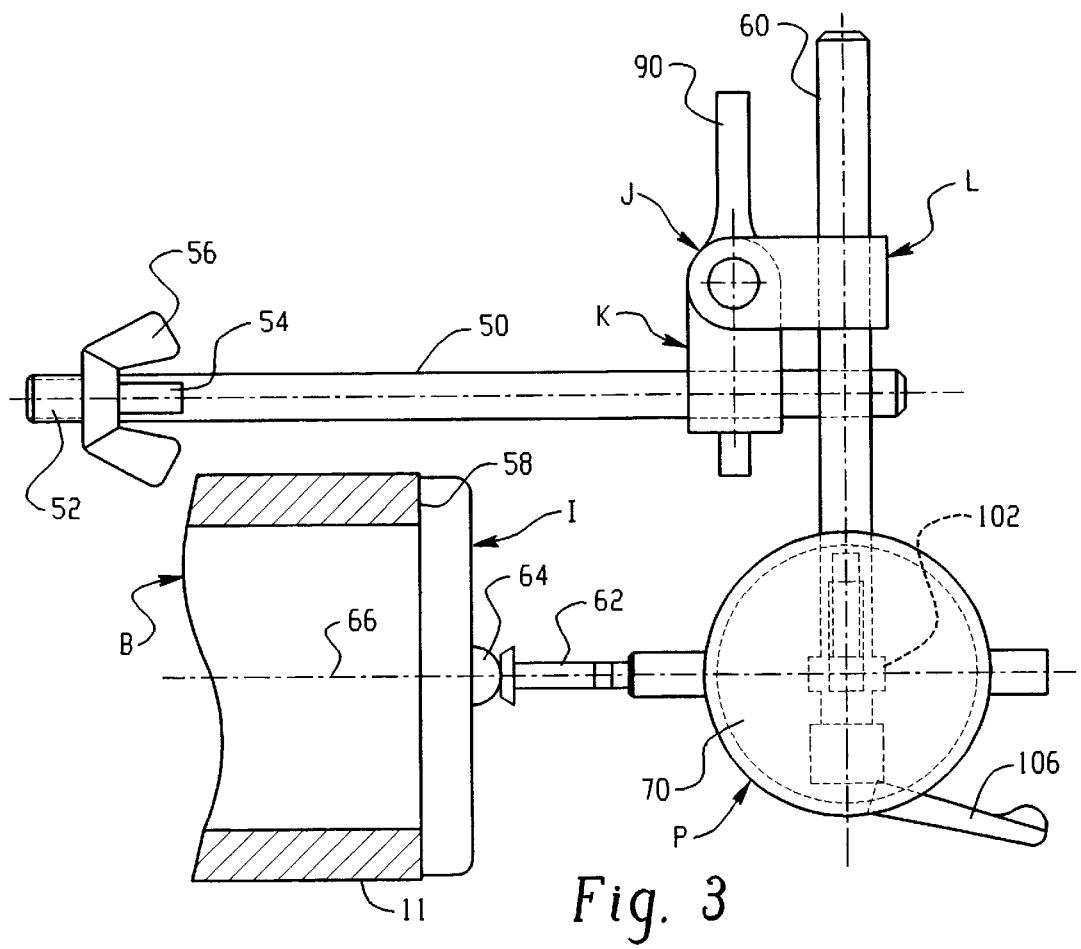
FIG. 3 is a top plan view of a measuring assembly constructed in accordance with the present application.

FIG. 3 shows an assembled measuring apparatus for measuring the bearing internal axial clearance in a wheel assembly. An elongated first support rod 50 has an externally threaded end portion 52 and opposite flats 54 for receiving a wrench. A wing nut 56 is threaded on end portion 52 and has an axial threaded length that is substantially shorter than the axial length of threaded end portion 52. After removal of a dust cover and its bolts, threaded end portion 52 on first support rod 50 is threaded into one of the tapped holes previously occupied by one of the dust cover bolts. Wing nut 56 then is tightened against the annular flat end surface of the wheel hub to lock rod 50 in position and rigidify the attachment. When attached to a wheel hub as described, rod 50 extends substantially parallel to the longitudinal axis of the axle and is spaced radially outwardly therefrom. First support rod 50 also extends axially outwardly beyond the terminal end 58 of axle end portion 11 as shown in FIG. 3.

A second elongated support rod 60 extends substantially perpendicular to first support rod 50 toward the end of the axle in outwardly spaced relationship thereto. A dial indicator P is attached to second support rod 60 and has an actuator plunger 62 that is spring biased outwardly from dial indicator P to the left in FIG. 3. Actuator plunger 62 engages a generally spherical projection 64 on an end plate assembly I that is magnetically attached to terminal end 58 of tubular axle end portion 11. Projection 64 is located on longitudinal axis 66 of tubular axle B and provides a fixed reference surface on the end of the axle for cooperation with the dial indicator.

An adjustable clamping device J is provided for adjustably attaching second support rod 60 to first support rod 50. Adjustable clamping device J permits movement of second support rod 60 rotatably around first support rod 50, longitudinally along first support rod 50 and longitudinally of its own length. These adjustments permit alignment of the longitudinal axis of actuator plunger 62 with axle longitudinal axis 66, and permit locating actuator 62 in firm engagement with projection 64. After adjustment, clamping device J is locked to prevent movement of the second support rod relative to the first support rod.

Dial indicator P is of a conventional type such as model number 2-B15-075-5 available from Chicago Dial Indicator Company. Linear motion of actuator plunger 62 is converted to rotary motion of a pointer beneath a rotatable bezel 70 having suitable indicia circumferentially-spaced therearound. Bezel 70 is rotatable relative to base 71 of dial indicator P to zero the indicia with the pointer prior to making a measurement.

Adjustable clamping device J includes a generally U-shaped clamp K having a circular opening slidably receiving first support rod 50, and a generally U-shaped clamp L having a circular opening slidably receiving second support rod 60. Clamp K has spaced-apart legs 80 and 82 with suitable holes through which a bolt 84 freely extends with clearance. Clamp L has one leg 86 with a hole through which bolt 84 freely extends with clearance and another leg 88 to which bolt 84 is fixedly attached against rotation or axial movement relative thereto. A generally T-shaped handle 90 is threaded on bolt 84 for axial movement on bolt 84 as handle 90 is rotated.

Figure 4:
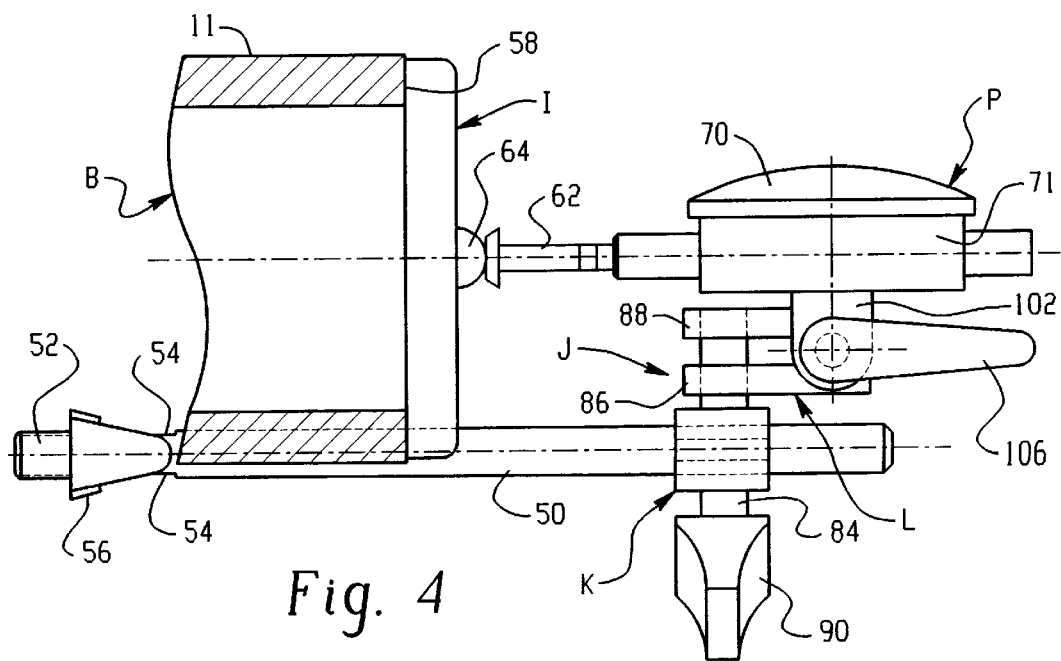
FIG. 4 is a side elevational view thereof.
Figure 5:
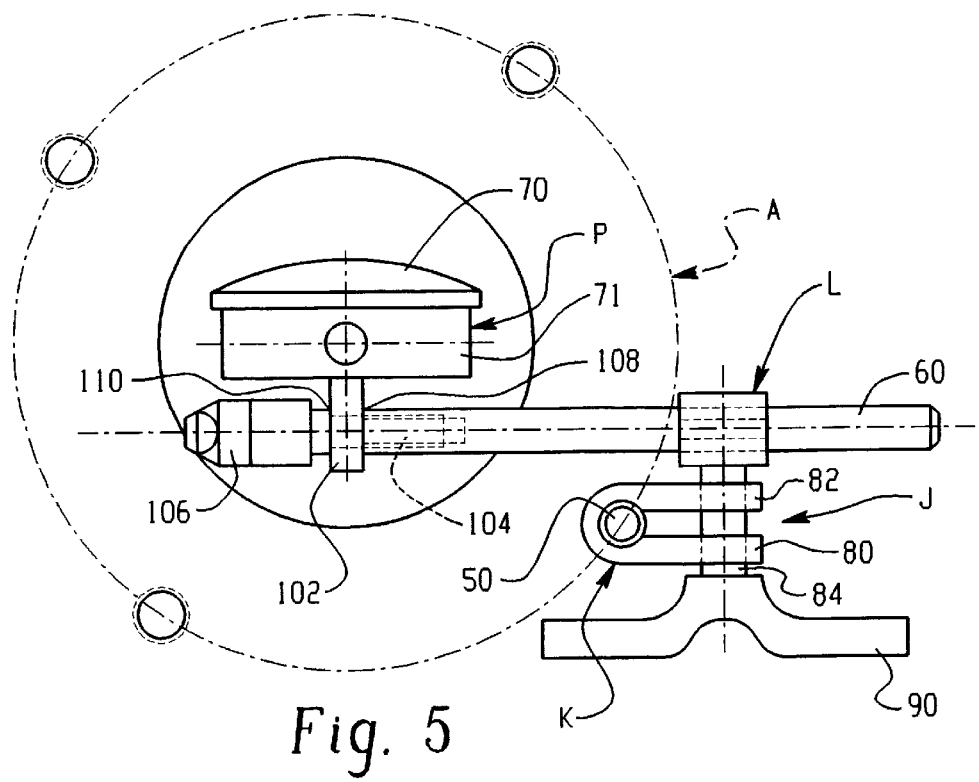
FIG. 5 is an end elevational view thereof.

With reference to FIGS. 4 and 5, once second support rod 60 has been moved to its desired position for engaging actuator plunger 62 with projection 64 and aligning same with the axle longitudinal axis, handle 90 is rotated for moving same along bolt 84 into engagement with leg 80 on clamp K. This starts clamp K turning counterclockwise about first support rod 50 in FIG. 5 until leg 82 on clamp K engages leg 86 on clamp L. Continued tightening rotation of handle 90 will also draw bolt 84 downwardly in FIGS. 4 and 5 so that legs 80 and 82 will be drawn together for tightening clamp K on first support rod 50 and for drawing together legs 86 and 88 on clamp L to tighten same on second support rod 60. Movement of the clamp legs toward one another changes the size and shape of the circular clamp openings so that the clamps tightly grip the support rods and become immovable relative thereto.

The articulated support assembly enables universal motion of dial indicator H generally equivalent to a swivel for properly locating the dial indicator relative to the axle longitudinal axis. Once the articulated support is locked by the clamping device, it is a substantially rigid assembly with a rigid and stable mechanical fastener connection to the wheel hub.

Dial indicator P has a downwardly projecting mounting bracket 102 with a hole therethrough closely receiving a threaded rod 104 attached to a handle 106. Threaded rod 104 is threaded into a tapped axial hole in the end of second support rod 50, and bracket 102 is clamped between flat terminal end 108 of second support rod 60 and a shoulder 110 on handle 106. Loosening of handle 106 permits rotational movement of dial indicator assembly H clockwise and counterclockwise in FIG. 4 about the longitudinal axis of second support rod 60 to properly align the terminal end of actuator lunger 62 with projection 64. Handle 106 may include a spring loaded ratchet clutch so that it can be pulled outwardly and freely returned to a storage position as indicated in FIG. 4 after tightening of same to clamp bracket 102 against further movement.

Figure 6:
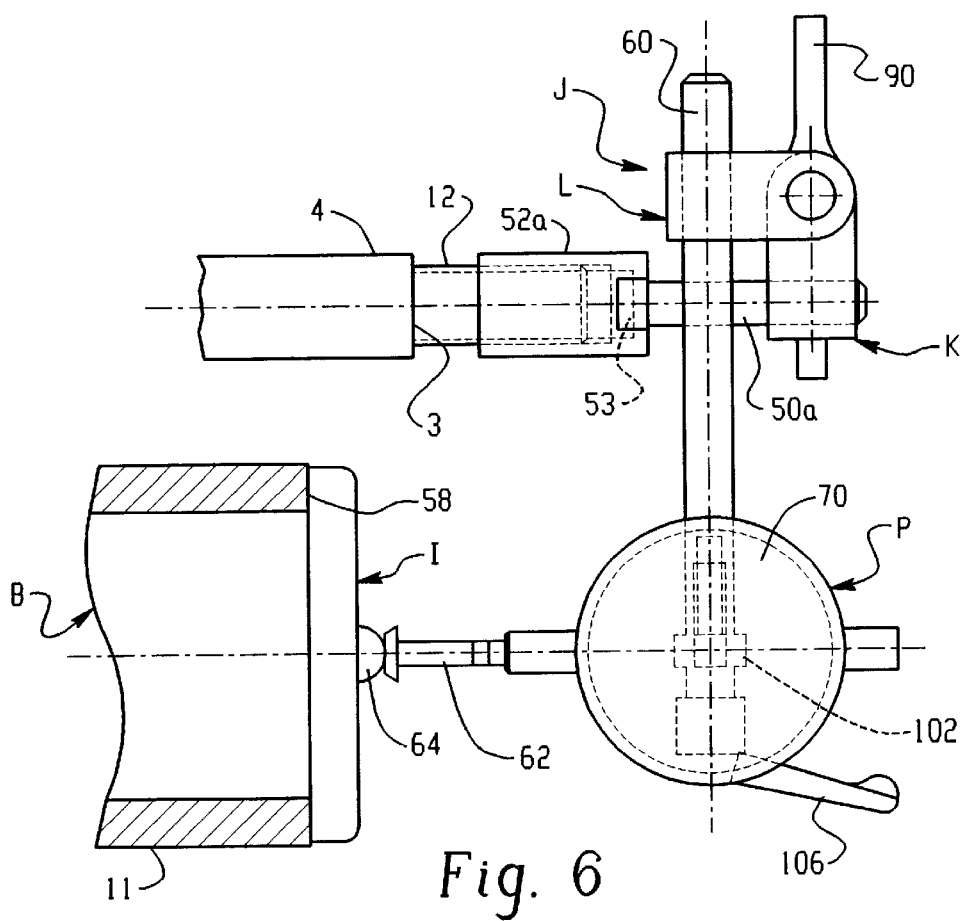
FIG. 6 is a top plan view of a measuring apparatus having a modified support arrangement.

FIG. 6 shows an arrangement for use on a drive wheel hub such as shown in FIG. 1. In this arrangement, first support rod 50a has an internally threaded socket 52a attached thereto. Rod 50a has a non-circular end portion extending with a press fit through a similarly shaped hole in a closed end of socket 52a, and is deformed internally of the socket as generally indicated at 53 to rigidly and permanently attach rod 50a to socket 52a. Socket 52a is threaded onto one of the threaded studs that extend outwardly from annular flat end 3 of cylindrical hollow end portion 4 on drive wheel hub A after the nuts of stud and nut assemblies 12 have been removed along with the separable drive shaft portion F. The other aspects of the arrangement in FIG. 6 are assembled, attached and used in the same manner as described with respect to FIGS. 3–5.

Figure 7:
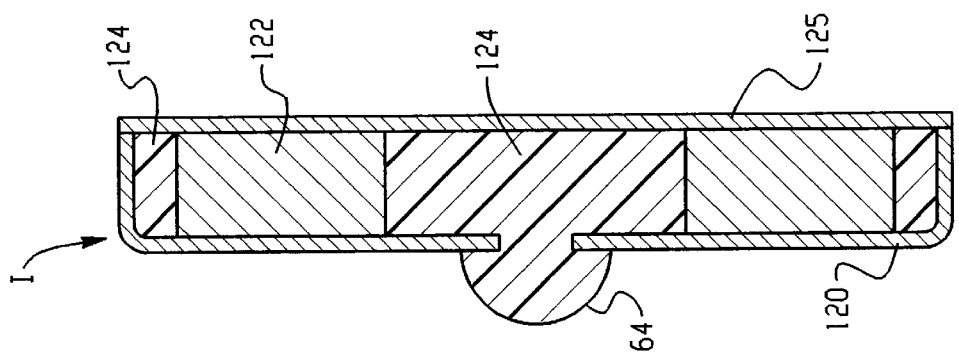
FIG. 7 is a cross-sectional elevational view of an end plate that provides a fixed reference surface on the end of an axle.

FIG. 7 shows end plate I as having a generally cylindrical cup 120 of non-magnetic stainless steel receiving an annular permanent magnet 122 held in place by synthetic plastic material 124 molded within cup 120. The plastic material extends through a suitable central hole in cup 120 and is shaped to form a generally spherical or otherwise curved projection 64. End plate I is attachable to an end of a ferrous axle by magnetic attraction of annular magnet 122. End plate I may be manufactured in a plurality of different diameters to fit on a variety of different axle sizes.

End plate I has one substantially flat surface 125 and an opposite centrally located projection 64. Obviously, projection 64 could be centrally embossed in cup 120 or be molded integrally with a permanent magnet. The projection also may take many shapes and curvatures, and for some purposes could be generally conical rather than curved. Cup 120 provides a holder for the permanent magnet, and the cup recess receives the permanent magnet and the plastic material.

Use of the measuring apparatus will be explained with reference to FIGS. 3–6. In FIG. 5, the annular flat end on the cylindrical hollow end portion of a wheel hub A will have either tapped holes for receiving dust cover attachment bolts or outwardly extending threaded studs for receiving nuts to connect a drive shaft to the wheel hub. A first support rod 50 or 50a is threaded and tightened to one of the tapped holes or studs. Second support rod 60 with attached dial indicator P then is assembled to the first support rod with adjustable clamping device J.

Second support rod 60 then is manipulated on and about first support rod 50 or 50a and along its own length to align actuator plunger 62 on dial indicator P with the longitudinal axis of the axle. Second support rod 60 and dial indicator P are moved toward the end of the axle a sufficient distance with actuator plunger 62 engaging projection 64 to rotate the pointer in dial indicator P at least two complete revolutions. Clamping device J then is tightened to rigidify and lock the entire support assembly against movement. Handle 106 then is loosened to permit rotary movement of dial indicator P about second support rod 60 for obtaining more precise alignment of actuator plunger 62 with the axle longitudinal axis and with a point on projection 64. Handle 106 then is rotated to lock dial indicator P against movement relative to second support rod 60.

The wheel then is grasped at the ten o'clock and two o'clock positions, and pulled in a direction to pull it off of the axle while simultaneously rotatably oscillating the wheel about 90° to bottom out the bearing at one end limit. While continuing this procedure, bezel 70 on dial indicator P is rotated relative to base 71 to zero the bezel indicia with the pointer. The wheel then is pushed in the opposite direction while continuing to rotatably oscillate same so that the bearing bottoms out at the opposite end limit of play. During the pushing movement, the entire measuring assembly moves with the wheel hub a distance that is approximately equal to the bearing internal axial clearance. Actuator plunger 62 moves inwardly toward dial indicator P the same distance by reacting against the fixed reference surface defined by projection 64 on the end of the axle. Movement of the pointer within dial indicator P then provides a readout of the bearing internal axial clearance. If the pointer does not move, there is no bearing internal axial clearance and the bearing is preloaded.

It will be recognized that it is possible to use the measuring apparatus of the present application with the actuator plunger engaging a flat surface on the end of the axle outwardly from the axle longitudinal axis. However, the preferred arrangement is to have the actuator plunger engaging a fixed reference surface or point located on the longitudinal axis of the axle. This may be provide by the projection on an end plate I or by a ball bearing as explained with reference to FIG. 9.

Figure 8:
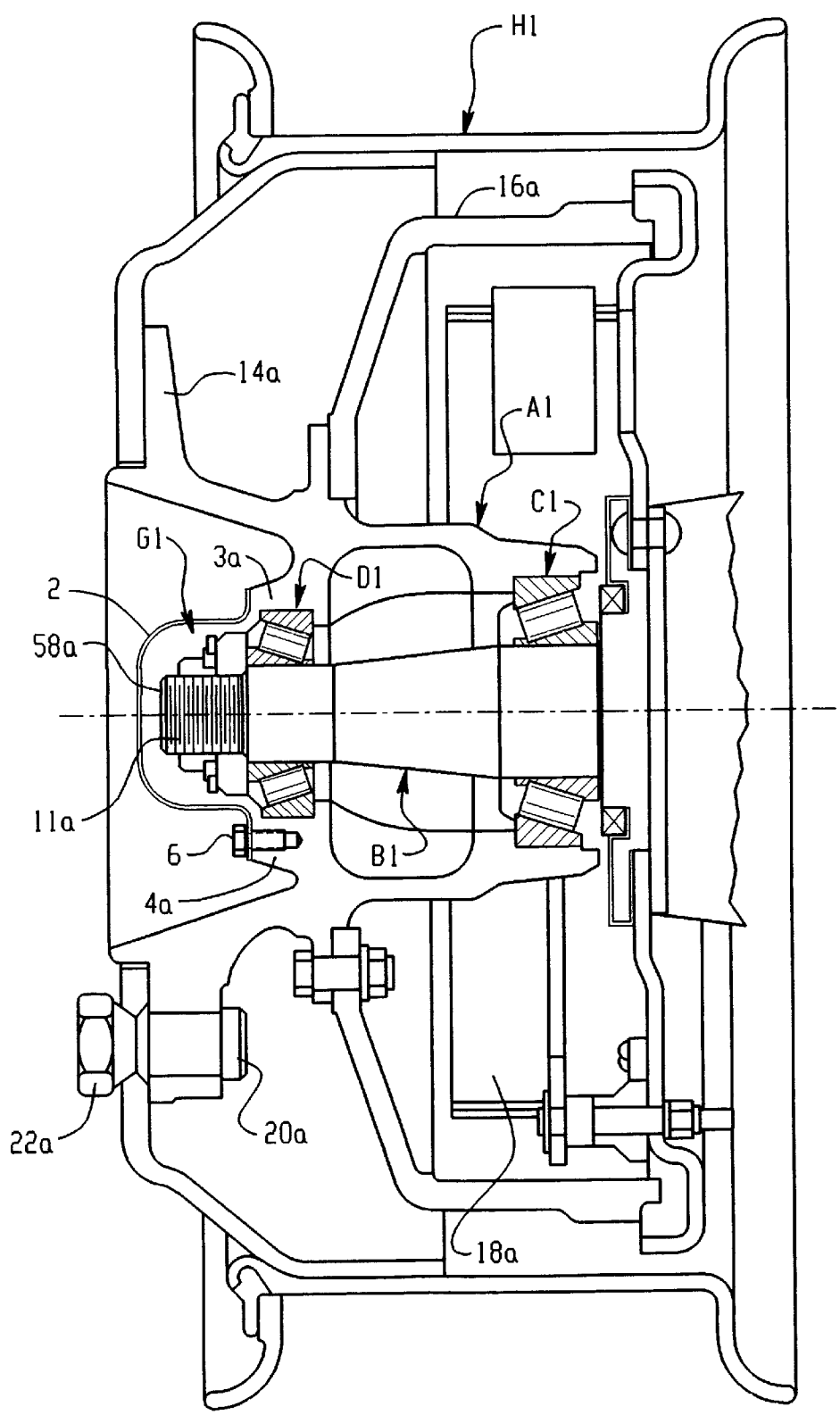
FIG. 8 is a cross-sectional elevational view of a non-driving truck front wheel.

FIG. 8 shows one type of non-drive wheel assembly with which the measuring apparatus of the present application can be used. A dust cover 2 covering adjustment assembly G1 has an outwardly extending flange clamped against annular flat end 3a on cylindrical end portion 4a of wheel hub A1 by a plurality of circumferentially-spaced bolts, only one of which is shown at 6 in FIG. 8. The dust cover bolts extend freely through suitable holes in the dust cover flange and thread into tapped holes extending into cylindrical end portion 4a of wheel hub A1 from annular flat end 3a.

Figure 9:
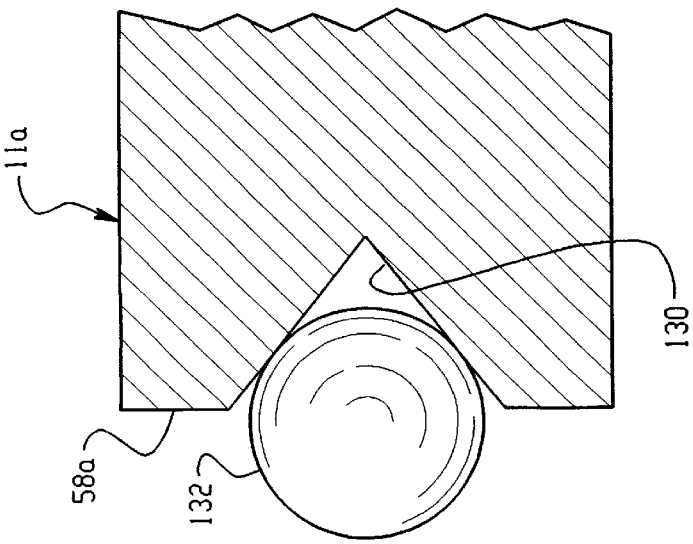
FIG. 9 is a partial cross-sectional elevational view showing a central recess in an end of an axle and a ball bearing retained in the recess by grease.

In the arrangement of FIG. 8, axle B1 is solid rather than tubular and end 58a of axle outer end portion 11 has a central recess 130 therein as shown in FIG. 9. Grease is placed in recess 130 and a ball bearing 132 is positioned within recess 130 for retention therein by the grease. In this arrangement, the end of actuator plunger 62 on dial indicator P engages ball bearing 132.

The other features of the wheel assembly in FIG. 8 include heel hub A1 mounted on axle B1 by bearings C1 and D1 whose axial clearance is adjusted by use of adjusting assembly G1. Wheel H1 is removably attached to flange 14a of wheel hub A1 by lug nuts 22a threaded onto bolts 20a that are press fitted through holes in flange 14a. Brake drum 16a is attached to another flange on wheel hub A1 by nut and bolt assemblies for cooperation with brake shoes 18a.

Figure 10:
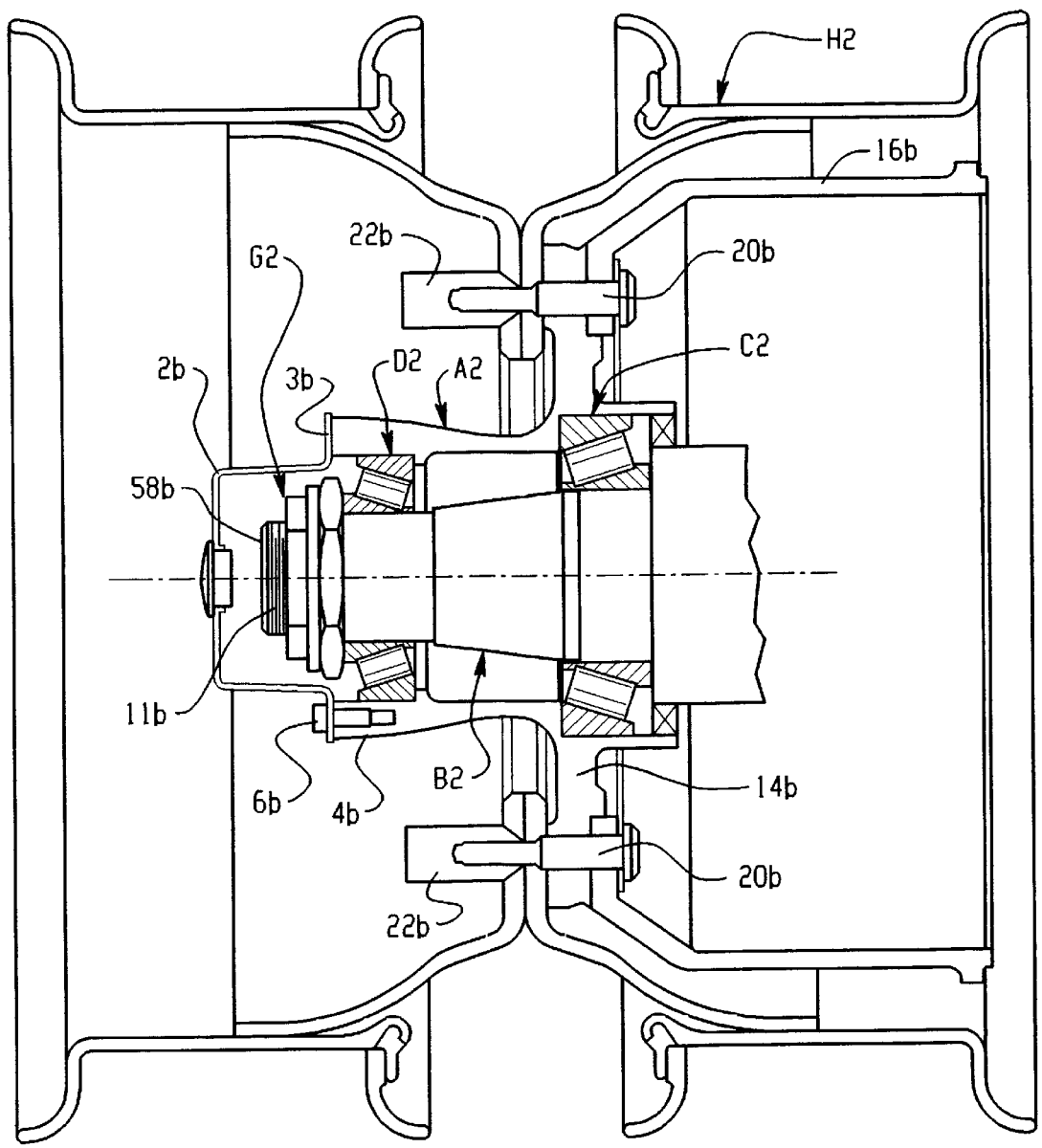
FIG. 10 is a cross-sectional elevational view of one type of trailer axle wheel.

FIG. 10 shows one type of trailer axle wheel having dust cover 26 secured against annular flat end 3b on cylindrical end portion 4b of wheel hub A2 by bolts 6b. The other items illustrated in FIG. 10 show wheel hub A2 rotatably mounted on axle B2 by bearings C2 and D2. A bearing clearance adjustment assembly G2 on outer end portion 11b of axle B2 is covered by the removable dust cover 2b. Suitable holes in flange 14b on wheel hub A2 have bolts 20b press fitted therethrough for receiving lug nuts 22b to releasably mount wheel H2 on wheel hub A2. Numeral 16b references a brake drum while numeral 58b references the outer end of axle B2.

End plate I is used to provide a fixed reference surface or point on the end of the axle with the wheel assemblies of FIGS. 1 and 10. With the wheel assembly of FIG. 8, a ball bearing is used to provide the fixed reference surface on the end of the axle as shown in FIG. 9.

The parts of the measuring apparatus described with reference to FIGS. 4–6 can be stored in a special case so that the parts define a kit for use in measuring bearing internal axial clearance. This eliminates the problem of searching around a repair shop for suitable parts. The case simply is opened, the first support rod is attached to the wheel hub and the second support rod with attached dial indicator is attached to the first support rod by the adjustable clamping device. After use, the parts may be disassembled and returned to their storage case, although the dial indicator may be left attached to the second support rod. The kit may include several different end plate sizes, as well as several different extensions and adapters for use with one or the other type of support rod.

The threaded studs or tapped holes in the hub define threaded fastener elements to which the support assembly is mounted. The externally or internally threaded end portion of the first support rod defines a threaded connector that is attached to a threaded fastener element on the hub. In certain cases, it may be possible to use the wheel lug bolts or the tapped holes that receive lug bolts for attaching a measuring apparatus support assembly to the wheel hub. Various adapters and extensions may be provided to make the mechanical threaded connection of the support assembly to the wheel hub. Thus, a threaded connector on the support assembly is not necessarily directly attached to the threaded fastener element on the wheel hub. Non-drive wheel hubs that do not have tapped holes for dust cover bolts may have an adapter clamped or otherwise attached to the inner or outer surface thereof adjacent the annular flat end. A tapped hole or a threaded stud may be provided on the adapter for attaching the measuring device.

Although the invention has been shown and described with respect to certain preferred embodiments, it is obvious that equivalent alterations and modifications will appear to others skilled in the art upon the reading and understanding of this specification. The present invention includes all such equivalent alterations and modifications, and is limited only by the scope of the claims.

I claim:

1. Apparatus for measuring axial play in a wheel bearing that rotatably supports a wheel hub on an axle, the wheel hub having threaded fastener elements that extend parallel to the longitudinal axis of the axle, said apparatus comprising: an articulated support assembly that includes a threaded connector attachable to a threaded fastener element on the wheel hub, said support assembly carrying a dial indicator having an actuator, said articulated support assembly providing selective adjustable movement of the dial indicator relative to the axle in directions extending both parallel and perpendicular to the axle longitudinal axis to locate said dial indicator in a measuring position with said actuator engaging a fixed reference surface provided on the axle end, and a selectively operable clamping device that selectively locks said support assembly to hold said dial indicator in said measuring position against further adjustable movement.

2. The apparatus of claim 1 including a magnetic end plate that is magnetically attachable to the axle end to define the fixed reference surface that cooperates with the actuator on the dial indicator.

3. The apparatus of claim 1 wherein said support assembly includes a pair of first and second support rods extending substantially perpendicular to one another, said first support rod extending substantially parallel to the axle longitudinal axis in outwardly-spaced relationship thereto, said dial indicator being mounted on said second support rod, said adjustable clamping device releasably clamping said second support rod to said first support rod for selective movement of said second support rod rotatably about said first support rod, longitudinally along said first support rod and longitudinally of its own length in a direction substantially perpendicular to said first support rod.

4. The apparatus of claim 3 wherein said dial indicator is adjustably mounted on said second support rod for selective rotational movement of said dial indicator about said second support rod.

5. The apparatus of claim 1 wherein said support assembly includes a fixed support rod that extends substantially parallel to the axle longitudinal axis, said threaded connector being on one end portion of said fixed support rod, and said articulated support assembly including at least one movable support rod adjustably attached to said fixed support rod to provide adjustable movement of the dial indicator in directions extending both parallel and perpendicular to the axle longitudinal axis.

6. The apparatus of claim 5 wherein said threaded connector comprises an externally threaded end portion of said support rod.

7. The apparatus of claim 5 wherein said threaded connector comprises an internally threaded socket on one end portion of said support rod.

8. Apparatus for measuring axial play in a wheel bearing assembly that rotatably mounts a wheel hub to an axle having an axle longitudinal axis about which the wheel hub rotates and an axle end that accommodates a fixed reference surface aligned with the axle longitudinal axis, the wheel hub having threaded fastener elements that extend parallel to the axle longitudinal axis, said apparatus comprising: a first support rod threadably attachable to a threaded fastener element on the wheel hub in a position extending substantially parallel to and radially spaced from the axle longitudinal axis, a second support rod extending transversely of said first support rod in a direction toward the axle end and carrying a dial indicator having an actuator that cooperates with the fixed reference surface, said second support rod being adjustably attached to said first support rod to provide selective adjustable movement of said second support rod relative to said first support rod to move the dial indicator in directions extending both parallel and perpendicular to the axle longitudinal axis for positioning the actuator in engagement with the fixed reference surface and in alignment with the axle longitudinal axis.

9. The apparatus of claim 8 wherein said dial indicator is selectively rotatably adjustable about said second support rod.

10. The apparatus of claim 8 wherein said first and second support rods are adjustably clamped together by an adjustable clamping device that selectively provides movement of said second support rod rotatably about said first support rod, longitudinally along said first support rod and longitudinally of its own length in a direction transversely of said first support rod.

11. A kit for use in measuring bearing internal axial clearance comprising: a first support rod having a threaded connector at one end portion thereof for attachment to a threaded fastener element on a wheel hub, a second support rod, an adjustable rod clamping device for adjustably clamping said second support rod to said first support rod with said second support rod extending transversely of said first support rod, said adjustable rod clamping device providing selective adjustment of said second rod relative to said first rod rotatably about said first support rod, axially along said first support rod, and axially along its own length in a direction transversely of said first support rod, and a dial indicator attachable to said second support rod for cooperation with a fixed reference surface on the end of an axle.

12. The kit of claim 11 including an adjustable dial indicator clamping device for adjustably clamping said dial indicator to said second support rod, said adjustable dial indicator clamping device providing rotational adjustment of said dial indicator about said second support rod.

13. A method of measuring bearing internal axial clearance comprising the steps of threadably fastening an adjustable support assembly to a threaded fastener element on a wheel hub that is rotatably mounted on an axle by a bearing assembly, adjusting the support assembly to align and engage an actuator on a measuring indicator that is carried by the support assembly with a fixed reference surface on the end of the axle by moving the measuring indicator in directions extending both parallel and perpendicular to the axle longitudinal axis, locking the support assembly to hold the measuring indicator in a measuring position against further adjustable movement, and axially moving the wheel hub between its end limits of movement to obtain a readout on the measuring indicator as the support assembly and indicator move axially with the wheel hub relative to the fixed reference surface.

14. An end plate for attachment to an end of a wheel axle for use in measuring bearing internal axial clearance, said end plate including a permanent magnet and having one flat surface and an opposite surface with a centrally located projection.

15. The end plate of claim 14 wherein said end plate includes a non-magnetic holder having said permanent magnet attached thereto.

16. The end plate of claim 15 wherein said holder is generally cup-shaped with a recess in one side receiving said magnet.

17. The end plate of claim 16 wherein said holder has a central hole therein and further including plastic material within said recess for retaining said magnet therein and extending through said hole to provide said centrally located projection.

18. A kit for use in measuring bearing internal axial clearance comprising: a first support rod having a threaded connector at one end portion thereof for attachment to a threaded fastener element on a wheel hub, a second support rod, an adjustable rod clamping device for adjustably clamping said second support rod to said first support rod with said second support rod extending transversely of said first support rod, said adjustable rod clamping device providing adjustment of said second rod rotatably about said first support rod, axially along said first support rod, and axially along its own length, a dial indicator attachable to said second support rod, and a magnetic end plate magnetically attachable to the end of an axle and having an outwardly projecting reference surface for cooperation with said dial indicator.

19. Apparatus for measuring axial play in a wheel bearing that rotatably supports a wheel hub on an axle, the axle having an end reference surface and the wheel hub having threaded fastener elements that extend parallel to the longitudinal axis of the axle, said apparatus comprising: a single fixed support rod attached to one of said threaded fastener elements and extending outwardly from said wheel hub in outwardly-spaced substantially parallel relationship to the axle longitudinal axis, a movable support rod having a first end portion adjustably attached to said fixed support rod, said movable support rod extending inwardly toward the axle longitudinal axis from said fixed support rod and having an unsupported and unsecured second end portion opposite from said first end portion, a dial indicator attached to said second end portion of said movable support rod and having a dial indicator actuator, said movable support rod being adjustable relative to said fixed support rod rotatably about said fixed support rod, axially along said fixed support rod and axially along its own length transversely of said fixed support rod to move said second end portion of said movable rod and said dial indicator carried thereby in directions extending both parallel and perpendicular to the axle longitudinal axis to place said dial indicator in a measuring position with said actuator engaging the axle end reference surface, and a selectively operable clamping device that selectively clamps said movable rod against movement relative to said fixed rod to hold said dial indicator in said measuring position against further adjustable movement.

20. The apparatus of claim 19 wherein said dial indicator is adjustably attached to said movable support rod for selective rotational movement of said dial indicator relative to said movable support rod.

* * * * *